United States Patent
Paskov et al.

(10) Patent No.: US 10,351,107 B2
(45) Date of Patent: Jul. 16, 2019

(54) MAGNETIC HEATER FOR WIPER BLADE SYSTEM

(71) Applicants: Pasko Todorov Paskov, Varna (BG); Svilen Evgeniev Konstantinov, Varna (BG); Nikolay Krumov Petrov, Varna (BG)

(72) Inventors: Pasko Todorov Paskov, Varna (BG); Svilen Evgeniev Konstantinov, Varna (BG); Nikolay Krumov Petrov, Varna (BG)

(*) Notice: Subject to any disclaimer, the term of this patent is extended or adjusted under 35 U.S.C. 154(b) by 0 days.

(21) Appl. No.: 16/056,644

(22) Filed: Aug. 7, 2018

(65) Prior Publication Data

US 2018/0339678 A1  Nov. 29, 2018

Related U.S. Application Data

(63) Continuation-in-part of application No. 14/110,261, filed on Jul. 29, 2015, now Pat. No. 10,040,430, which is a continuation of application No. PCT/BG2013/000044, filed on Sep. 18, 2013.

(60) Provisional application No. 61/850,750, filed on Feb. 23, 2013.

(30) Foreign Application Priority Data

Sep. 20, 2012  (BG) .......................... 111311

(51) Int. Cl.
| | | |
|---|---|---|
| *B60S 1/48* | (2006.01) | |
| *B60S 1/52* | (2006.01) | |
| *B60S 1/50* | (2006.01) | |
| *B60S 1/56* | (2006.01) | |
| *B60S 1/54* | (2006.01) | |
| *B60S 1/38* | (2006.01) | |

(52) U.S. Cl.
CPC ............... *B60S 1/488* (2013.01); *B60S 1/50* (2013.01); *B60S 1/524* (2013.01); *B60S 1/546* (2013.01); *B60S 1/56* (2013.01); *B60S 2001/3839* (2013.01)

(58) Field of Classification Search
CPC ........... B60S 1/487; B60S 1/488; B60S 1/524
See application file for complete search history.

(56) References Cited

U.S. PATENT DOCUMENTS 5,383,247 A * 1/1995 Nickel .................... B60S 1/488
15/250.01

* cited by examiner

*Primary Examiner* — Andrew A Horton
(74) *Attorney, Agent, or Firm* — Gerald R. Black, Esq.

(57) ABSTRACT

A vehicle cleaning system in which washer fluid is dispensed through a windshield or headlight wiper blade via an integral channel and nozzles arrayed in a way so as to insure efficient dispensation of the cleaning solution. The vehicle cleaning system comprises a liquid reservoir, a controller in fluid communication with said liquid reservoir, a generator for vaporizing the wiper cleaning solution by rotating a magnet assembly relative to a conductor assembly housing the wiper cleaning solution about an axis so as to induce eddy currents when relative motion is produced between the conductor assembly and the magnet assembly, a vapor reservoir and a vapor distributor, and a wiper. Upon engagement of the controller, the wiper cleaning solution is delivered and pulsed into a space between a pair of wiper blades and across the surface to be cleaned of the vehicle. The magnet assembly has a closed contour loop construction.

20 Claims, 17 Drawing Sheets

WINDSHIELD WIPER**

Section B-B

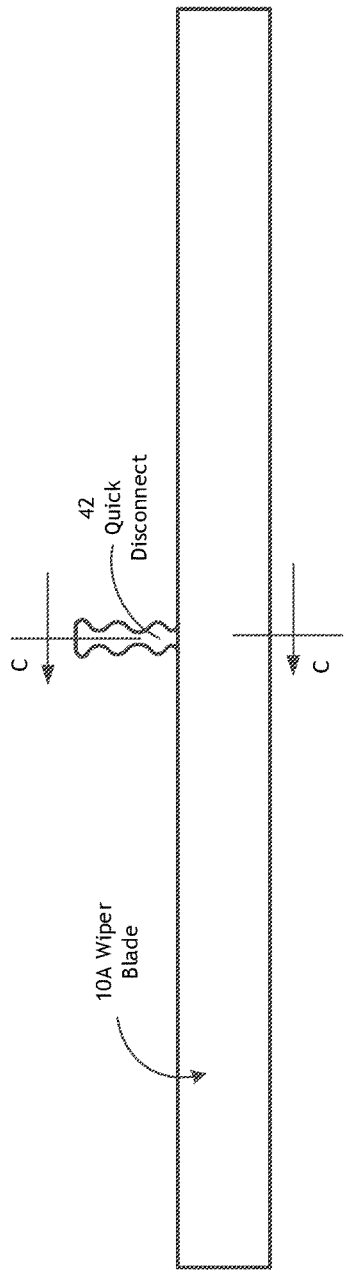
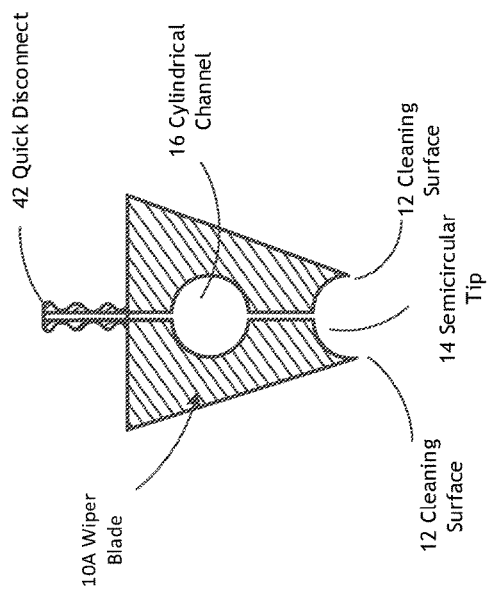
FIGURE 9
FIGURE 10
Section C-C

Section E-E

MAGNETIC HEATER FOR WIPER BLADE SYSTEM

CROSS-REFERENCE TO RELATED APPLICATIONS

This Continuation-In-Part Application and is related to U.S. Ser. No. 14/110,261, entitled "Enhanced Vehicle Wiper Blade System" (Pasko Todorov Paskov et al.) filed on Oct. 7, 2013; which is related to and claims priority to PCT/BG2013/000044 (Pasko Todorov Paskov et al.) filed Sep. 18, 2013; which is related to and claims priority to U.S. Provisional Application No. 61/850,750 (Pasko Todorov Paskov et al.) filed on Feb. 23, 2013; and which is related to and claims priority to the Patent issued from the Patent Department of Republic of Bulgaria, Bulgarian Patent Registration No. 111311 (Pasko Todorov Paskov et al.) filed on Sep. 20, 2012;

FIELD OF USE

The disclosed subject matter relates generally to devices used to heat fluids, and more particularly, to heaters that that use magnets to generate heat for windshield or headlight wiper blade cleaning systems for vehicles.

BACKGROUND OF THE INVENTION

Ensuring that the driver can see road conditions, oncoming traffic, pedestrians, and other obstacles is of paramount importance to the safe operation of any vehicle.

Prior approaches have the washer fluid nozzle located on the wiper arm, instead of being an integral part of the wiper blade itself, while others have the washer nozzles which are located on the hood of the vehicle. Critical to any wiper system is the generator used to heat the washer cleaning fluid. In addition, the fluid is prone to freezing in cold temperatures as temperatures drop. Also, the spraying of the fluid across the windshield is not uniform, leading to over-spraying some portions while under-spraying other portions.

- U.S. Pat. No. 8,866,053 (Berdut-Teruel (discloses a permanent magnet thermal generator having a rotating chamber with an attached optionally rotational heat element in close proximity to one or more permanent magnets. The relative motion of the heat element to the magnetic flux from the magnets results in heat generation and in some cases in levitation. Clothe driers, air furnaces, water heaters and other systems incorporating a permanent magnet thermal generator are also set forth.
- U.S. Pat. No. 6,011,245 (Bell) discloses a permanent magnet eddy current heat generator apparatus. The generator has a thermally insulated working fluid reservoir containing a working fluid and an elongate stationary ferrous metal tube disposed in the reservoir with an elongate permanent magnet rotatably mounted inside the tube that, upon rotation, causes the tube to become heated due to the eddy current generated in the tube side wall and the heat from the tube side wall is transferred to the working fluid in the reservoir. An elongate working fluid heat pipe has a first end connected with a working fluid reservoir outlet and a second end connected with a reservoir inlet. The elongate permanent magnet is rotated by the shaft of a motor electrically and magnetically insulated from the working fluid and elongate permanent magnet. A pump, also driven by the motor shaft, is connected in fluid communication between the working fluid reservoir outlet and the heat pipe to conduct working fluid in a closed loop from the reservoir, through the heat pipe, back into the reservoir, and around the exterior of the ferrous metal tube.

What is needed is an enhanced windshield or headlight wiper system with an integral washer fluid heating system that ensures that the washer cleaning fluid is available at all times when it is needed the most.

Accordingly, it is the object of the present invention provides a new and improved cleaning fluid vaporization system which overcomes the problems of the prior art.

It is also an object of the invention to provide a permanent magnet thermal generator that utilizes a plurality of permanent magnets; the plurality of permanent magnets provide for and change the magnetic strength produced by the magnets; and the strength produced by the magnets is varied by removing or adding removable substantially identical permanent magnets.

An object of this invention is to provide a permanent magnet eddy current heat generator which utilizes water or other fluid as a working fluid to heat said water or other working fluid.

It is therefore an object of the present invention to provide a permanent magnet eddy current heat generator that uses heat produced by eddy current generated by a permanent magnet rotated by a small electric motor to heat a working fluid which, in turn, heats said working fluid.

A still further object of this invention is to provide a permanent magnet eddy current heat generator that is simple in construction, reliable in operation, and economical to manufacture and service.

Other objects of the invention will become apparent from time to time throughout the specification and claims as hereinafter related.

SUMMARY OF THE INVENTION

The magnetic heater for wiper blade system of the present invention addresses these needs.

The magnetic heater for wiper blade system of the present invention is for cleaning a vehicle windshield or headlights.

A vehicle cleaning system in which washer fluid is dispensed through a windshield or headlight wiper blade via an integral channel and nozzles arrayed in a way so as to insure efficient dispensation of the cleaning solution. The vehicle cleaning system comprises a liquid reservoir, a controller in fluid communication with said liquid reservoir, a generator for vaporizing the wiper cleaning solution by rotating a magnet assembly relative to a conductor assembly housing the wiper cleaning solution about an axis so as to induce eddy currents when relative motion is produced between the conductor assembly and the magnet assembly, a vapor reservoir and a vapor distributor, and a wiper. Upon engagement of the controller, the wiper cleaning solution is delivered and pulsed into a space between a pair of wiper blades and across the surface to be cleaned of the vehicle. The magnet assembly has a closed contour loop construction.

A disk of non-magnetic material (which preferably is a plastic) in which strong magnets (preferably, neodymium, samarium or alnico) are firmly attached rotate at high speed near a short-wound conductor in which short-circuit current is induced, which is proportional to the force of the magnet and the speed of rotation and inversely proportional to the distance between the magnet and the conductor. When the electric current flows through the conductor, the metal of the conductor is heated. The temperature to which the conductor is heated depends upon magnet force, the number of disc magnets, the revolutions of the disc, the conductor material, and the distance between the magnets and the conductor.

The magnetic heater for wiper blade system of the present invention preferably has a closed contour loop construction. The magnets are firmly attached and rotate at high speed near a short-wound conductor in which a short-circuit current is induced. The induced current is proportional to the force of the magnet and the rotational speed. The induced current is inversely proportional to the distance between the magnet and the conductor. The stronger magnets will increase the temperature of the wiper cleaning solution. The magnetic assembly includes either a plurality of circular-shaped magnets or a plurality of parallelepiped-shaped magnets. A higher magnet rotational speed increases wire temperature of the wiper cleaning solution. The conductor assembly housing the wiper cleaning solution is between 160° and 200°, and the vapour exits the generator at between 280° C. and 320° C.

The wiper system of the present invention comprises a reservoir for storing cleaning solution, an integral fluid channel through which said cleaning solution is channeled upon activation, a pump which applies pressure to said cleaning solution moving said cleaning solution into and through nozzles in a wiper blade, a cleaning solution heating element which heats said cleaning solution based upon ambient temperature, a valve which regulates the flow of said cleaning solution to ensure a hammering action of said cleaning solution upon activation, and a plurality of nozzles disposed in said wiper blade. The plurality of nozzles is generally evenly spaced along the length of the wiper blade to provide an even distribution of cleaning solution across the surface to be cleaned.

Upon activation of the enhanced vehicle windshield wiper system of the present invention, the wiper cleaning solution is applied to the vehicle windshield or headlights by a pulsed and hammering action to remove debris and stains from the vehicle windshield or headlights. Upon activation of said enhanced vehicle windshield wiper system, vaporized fluid is channeled through the plurality of nozzles onto the vehicle windshield or headlights.

The device vaporizes fluids (liquids or gases (depending on the configuration chosen) with a relatively low energy consumption. The temperature to which the conductor is heated depends upon a number of factors including the magnetic force, the number of disc magnets, the speed of the rotating disk, the material of the conductor, and the distance between the magnets and the conductor.

In addition, for a complete understanding of the magnetic heater for wiper blade system of the present invention, reference is made to the following detailed description and accompanying drawings in which the presently preferred embodiments of the invention are shown by way of example. For purposes of illustration, the system of the present invention is depicted in a mechanism for a windshield. However, it will be readily appreciated by those skilled in the art that the system of the present invention has numerous other applications, including particularly, cleaning debris from the headlights of a vehicle. As the invention may be embodied in many forms without departing from spirit of essential characteristics thereof, it is expressly understood that the drawings are for purposes of illustration and description only, and are not intended as a definition of the limits of the invention.

BRIEF DESCRIPTION OF THE DRAWINGS

FIG. 9 depicts a side elevational view of a fourth preferred embodiment of a wiper blade for use in the magnetic heater for wiper blade system of the present invention, showing the quick disconnect that enables easy removal for servicing and replacement.

FIG. 10 depicts a cross-sectional view of the windshield wiper blade and the quick disconnect taken from FIG. 9 used in the magnetic heater for wiper blade system of the present invention.

DETAILED DESCRIPTION OF THE PREFERRED EMBODIMENTS

Figure 1A:
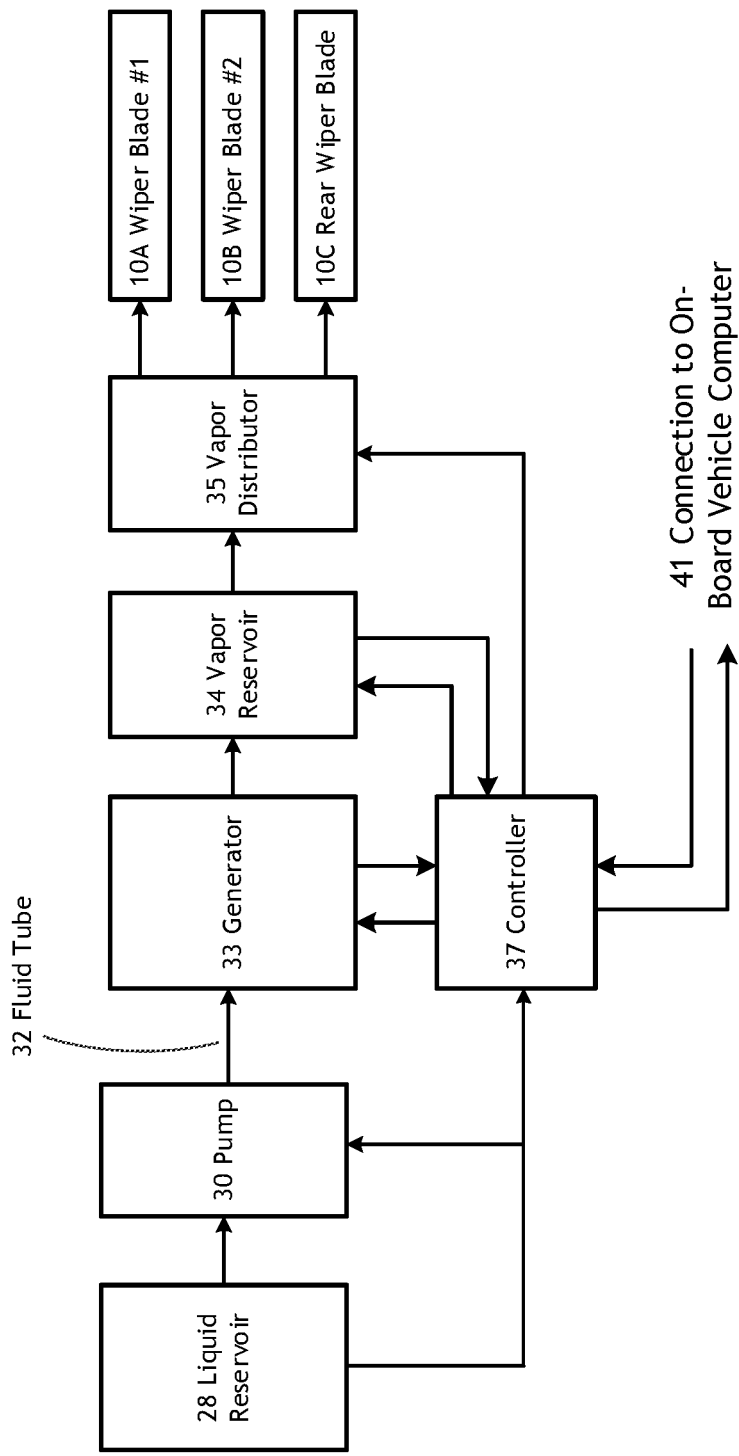
FIG. 1A depicts a first preferred embodiment of the schematic of the magnetic heater for wiper blade system of the present invention, including the liquid reservoir, the pump, the fluid tube, the generator, the steam reservoir, the steam distributor, three wiper blades, and a controller.
Figure 1B:
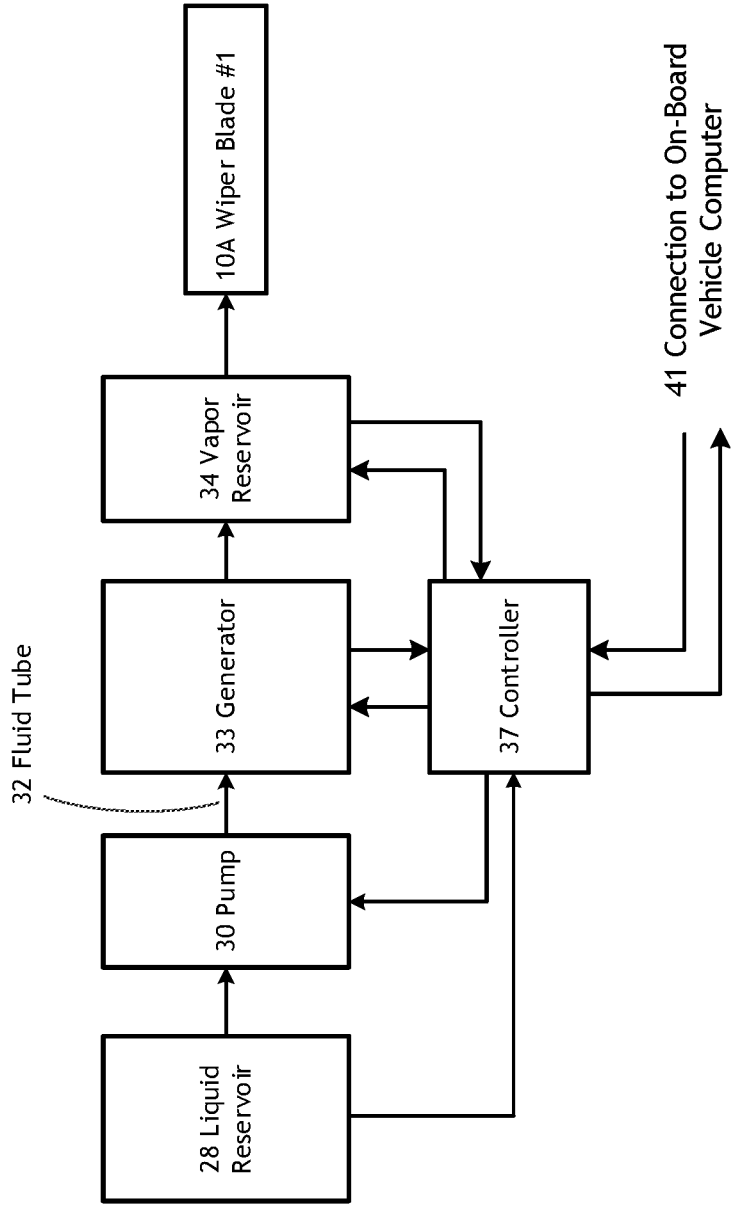
FIG. 1B depicts an alternate preferred embodiment of the schematic of the magnetic heater for wiper blade system of the present invention, including the liquid reservoir, the pump, the fluid tube, the generator, the steam reservoir, three wiper blades, and a controller.

Referring now to the drawings, FIGS. 1A and 1B depict the block diagram of magnetic heater for wiper blade system of the present invention. The magnetic heater for wiper blade system comprises a liquid/fluid reservoir [28/29], a pump [30] which moves the wiper cleaning solution from the liquid/fluid reservoir [28/29] into a generator pulls the from the reservoir [28] and pushes it through the fluid tube [32]. The cleaning fluid passes through a generator [36] where the cleaning fluid is heated, if necessary to the proper temperature based upon outside temperature. The cleaning fluid then passes through the valve [40], into the windshield wiper [10A, 10B, or 10C] which is connected to the fluid tube [32] via the quick disconnect [42], through the nozzles [20 and 22] for the integral nozzles in FIG. 2, and onto the windshield or headlight surface to be cleaned.

FIGS. 2-5 depict an assortment of exploded views of a first preferred embodiment of the enhanced vehicle wiper blade [10A] for the magnetic heater for wiper blade system of the present invention, showing the passages whereby the cleaning fluid is pulsed onto the surface to be cleaned, delivering a pulsed and hammering effect to clean the surface. Upon engagement of a controller [37], the wiper cleaning solution is delivered and pulsed across the surface to be cleaned of the vehicle to remove any debris or stains therefrom.

Figure 2:
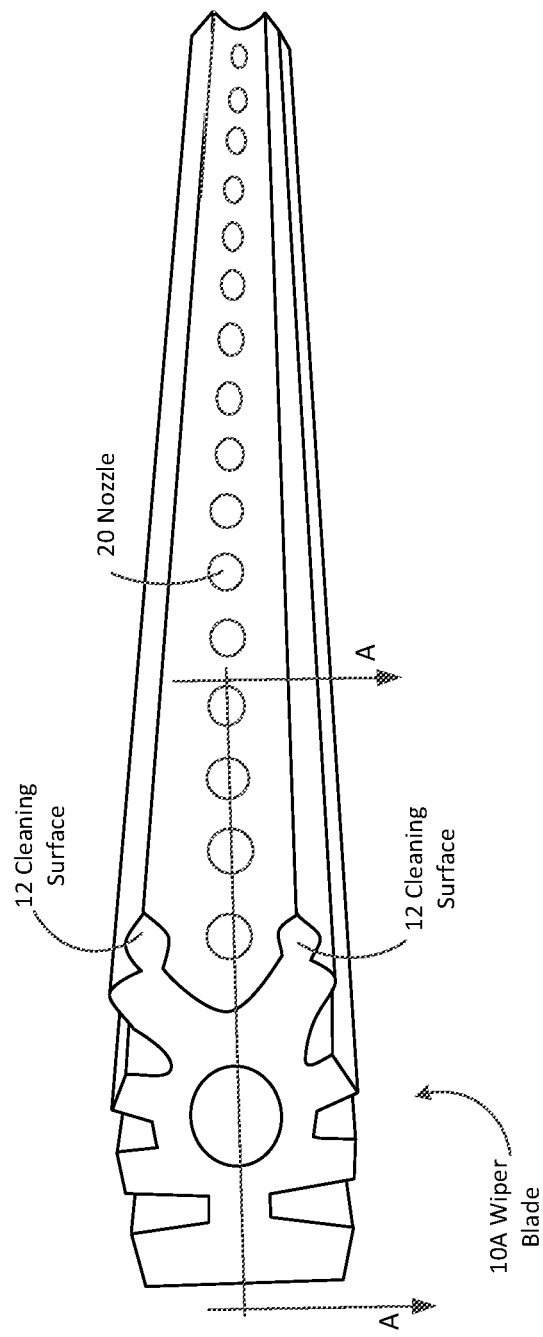
FIG. 2 depicts an isometric view of the underside of a first preferred embodiment of the windshield blade used in the magnetic heater for wiper blade system of the present invention, showing the passages whereby the cleaning fluid is pulsed onto the surface to be cleaned, delivering a hammering effect to clean said surface.
Figure 3:
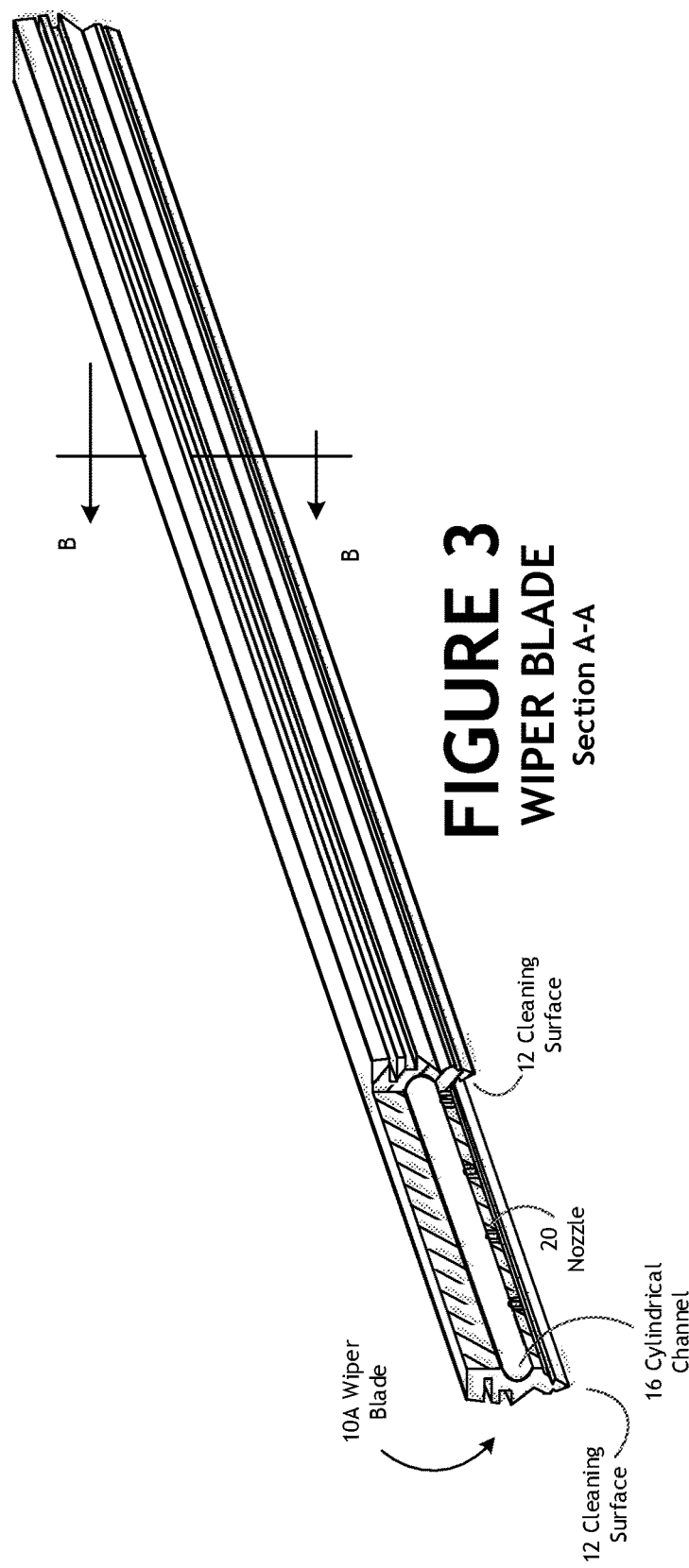
FIG. 3 depicts an isometric view of Section A-A of FIG. 2 of the first preferred embodiment of the windshield blade deployed in the magnetic heater for wiper blade system.
Figure 4:
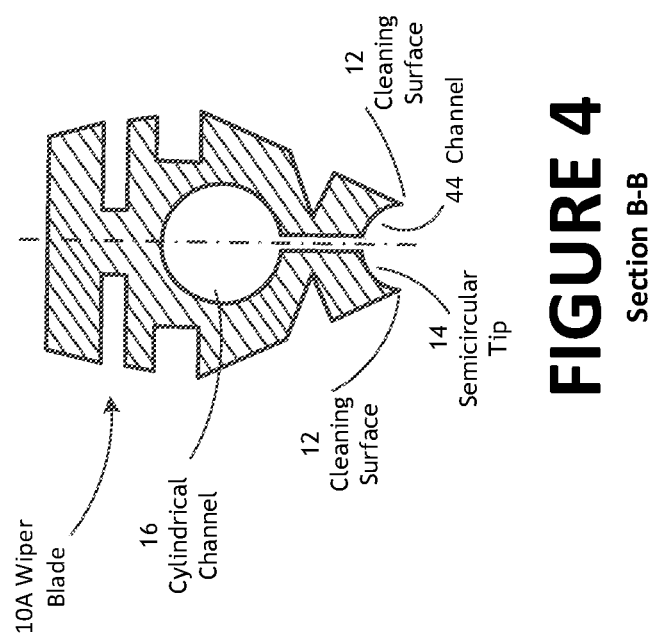
FIG. 4 depicts a partial a detailed cross-sectional view of the wiper blade of FIG. 2.

FIG. 3 is the elevational view of the first embodiment in FIG. 2 with a partial cross-section, wherein the nozzles [20, 22] are clearly visible as well as the two cleaning edges [12], and the channel [44] in between the edges. The cylindrical channel [16] feeds cleaning solution into and through the fluid spray nozzles [20] which are spaced at generally evenly-spaced intervals along the cleaning edge of the wiper blade [10A]. The spray nozzles [20] are normally closed and open as pressurized cleaning solution is circulated through them.

The nozzle [20] provides an essentially triangular shaped spray which is attached to the wiper blade [14] and is in fluid communication with the cylindrical channel [16]. The nozzle is preferably about 2.5 mm tall, about 1.6 mm wide, about 2 mm wide at its widest point, with the channel [16] preferably having a generally cylindrical shape being disposed in the substantially in the middle of the wiper blade [10A]. The nozzle [20] is preferably about 1.2 mm at its widest at the top and tapers to about 0.2 mm at its outlet.

Figure 5:
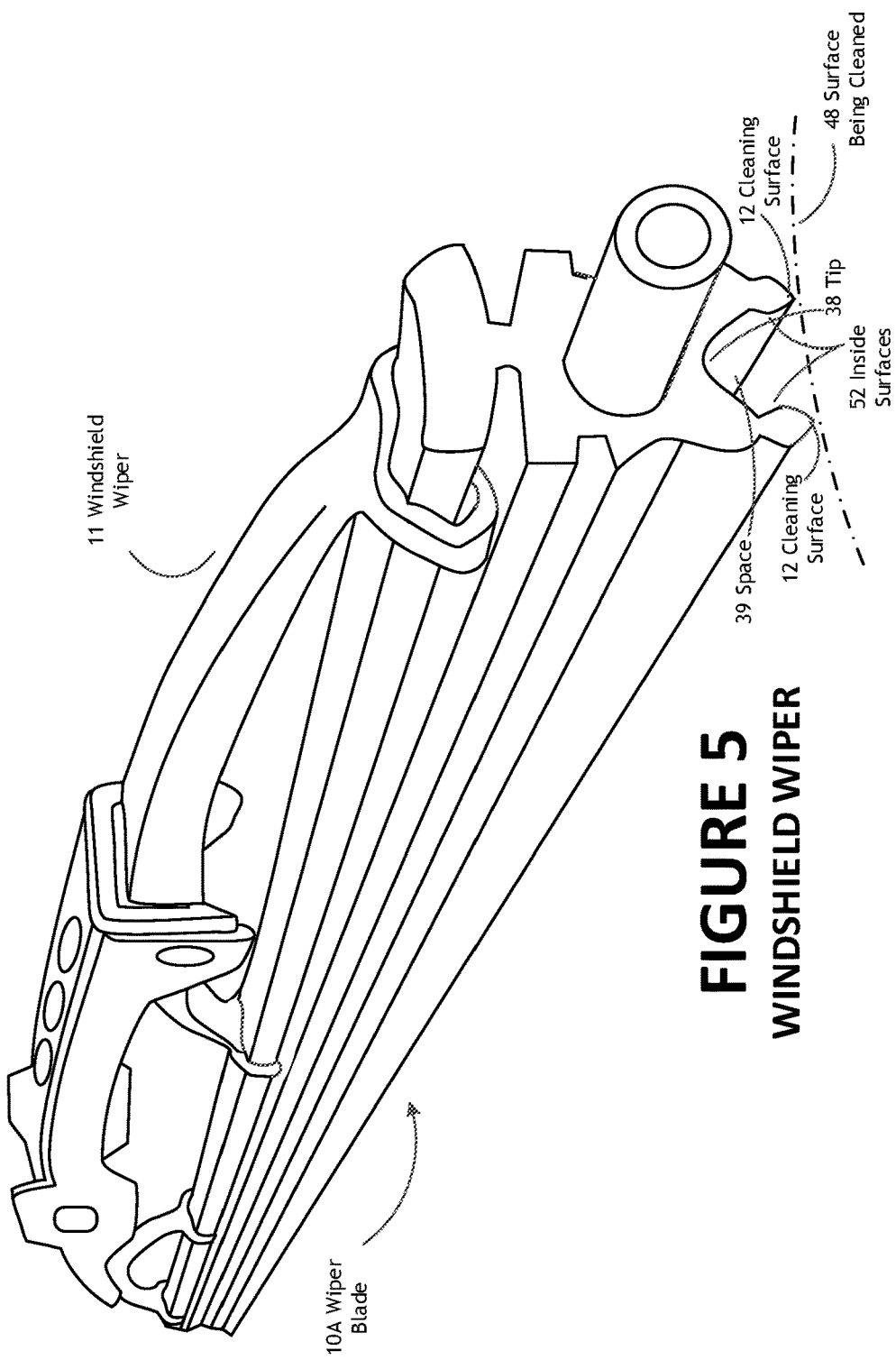
FIG. 5 depicts an exploded detailed view of the wiper blade of FIG. 2 mounted on a windshield wiper.

FIG. 5 depicts the enhanced vehicle windshield wiper system for use with the magnetic heater for wiper blade system of the present invention. The windshield wiper [10A] has a hollow channel [16], wherein the cleaning solution is routed through via nozzles [20] which are generally spaced at generally equal intervals along the wiper blade. The nozzles [20] are designed to be closed under normal driving conditions and to open when cleaning solution, under pressure, is forced through them. When the cleaning function is activated, the cleaning solution is circulated through the hollow channel [16] onto the windshield wiper [10A] under high pressure and out of the nozzles [20], thus opening the nozzles [20] and spraying the cleaning solution onto the cleaning surface as desired by the vehicle operator. The nozzles [20] are positioned along the length of the windshield wiper [10A] on the side which faces away from the vehicle driver and passenger.

The wiper [10A] also includes a pair of cleaning edges [12] for contacting the windshield or headlight of the vehicle being cleaned. The hollow cavity is in fluid communication with a plurality of nozzles [20], a tip [38] being disposed between the pair of cleaning edges [12], the plurality of nozzles [20] being disposed in the tip [38] and along a length of the wiper [10A]. The pair of cleaning edges [12] and the tip [38] form a space [39]. The space has a cross section with a convex shape. Upon engagement of the controller [37], the wiper cleaning solution is delivered and pulsed into the space [39] and across the surface to be cleaned of the vehicle to remove any debris or stains therefrom.

The windshield wiper blade [10A] comprises two cleaning surfaces [12] while the contour of its cross section which connects the vertices of the two edges forms a semicircle [14]. Running through the center of the blade, is a cylindrical channel [16] in which the fluid flows through. The top of the wiper blade [10A] is preferably about 8.2 mm in width, with the top width of the cleaning surfaces is about 9 mm tapering down to 7 mm, then 5.4 mm. The height of the wiper blade [10A] is preferably about 12.2 mm from the semi-circular tip [14] to the top surface of the blade. The radius of the semi-circular tip [14] is preferably about 4.5 mm.

Figure 6:
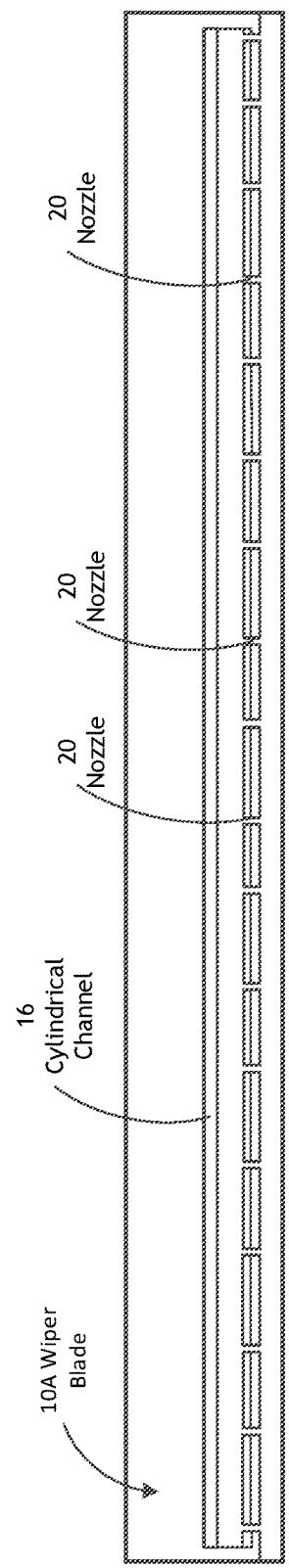
FIG. 6 depicts a side elevational view of a second preferred embodiment of a wiper blade for use in the magnetic heater for wiper blade system of the present invention.

FIG. 6 depicts a side elevational view of a second preferred embodiment of a wiper blade for use in the magnetic heater for wiper blade system of the present invention.

Figure 7:
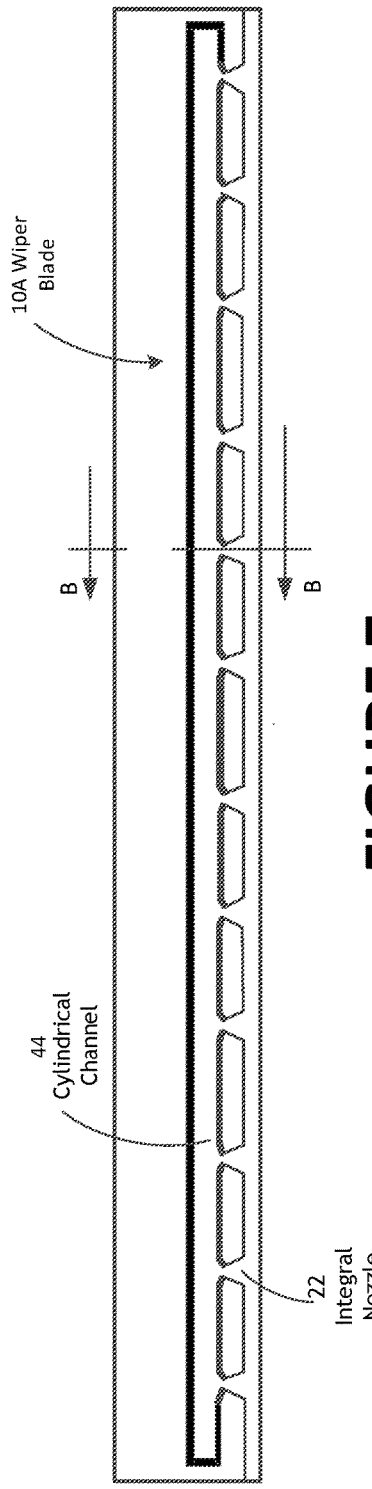
FIG. 7 depicts a side elevational view of a third preferred embodiment of a wiper blade for use in the magnetic heater for wiper blade system of the present invention.

FIG. 7 depicts a third preferred embodiment of the windshield wiper blade [10A] of the present invention in which the fluid flows through the cylindrical channel [16] which is disposed in the center of the blade and onto the surface to be cleaned via integral nozzles [22] which are spaced at regular intervals along the cleaning edge of the windshield wiper blade [10A]. The integral nozzles [22] are hemispherical in shape with the openings having a conical shape to improve spreading the liquid over a larger area, improving cleaning ability, while using up to 30-40% less fluid as compared to other systems. Activation of the integral nozzles [22] is via pressurized fluid during use. The nozzles [22] remain closed when the system is not activated.

In this embodiment, the cylindrical cavity [16] which comprises the channel in the center of the wiper blade [10A] from which the cleaning solution is then sprayed onto the vehicle windshield or headlight, is molded with integral nozzles so as to reduce production times and cost. The nozzles [22] are preferably hemispherical in shape so as to improve the concentration of the cleaning solution stream, while the conical shape of the opening aids in spreading the cleaning solution across a larger area.

Also, the valve [40] enables a better distribution of the cleaning solution being sprayed across the windshield or headlight. The valve [40] also enables a hammering action of the cleaning solution upon activation, enabling a more efficient cleaning by increasing pressure. As a result of use of the valve [40], it is estimated there will be a 30-40% savings in cleaning solution as compared with conventional systems.

The cleaning surface [12] is split into two surfaces, leaving a space between, creating a channel [44] into which the nozzles [20] inject the cleaning solution. This channel [44] enables the efficient cleaning of the windshield by preventing the cleaning solution from blowing away under high vehicle speeds, reducing the amount of cleaning solution used. The distance of the nozzles [20] from the windshield in this channel [44] is 3-4 mm.

The windshield wiper blade has two cleaning edges [12], with an attachment at one end for the fluid pipe, which is located inside the wiper blade. The wiper blade [10A] is connected to the fluid reservoir [28], electric pump [30], and generator [36]. The generator [36] raises the temperature of the cleaning solution, based on outside temperature, perhaps even to a vaporized state, as the cleaning solution flows out of the reservoir and into the cavity into the wiper blade. The system uses a temperature sensor mounted outside the vehicle, or an existing temperature sensor in the vehicle engine compartment, or elsewhere in the vehicle to determine outside ambient temperature and adjust the washer fluid temperature accordingly.

Figure 8:
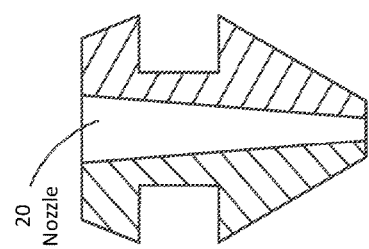
FIG. 8 depicts an exploded sectional detailed view B-B of the nozzle of FIG. 7.

FIG. 8 depicts an exploded detailed sectional view of a typical nozzle of the wiper blade for use in the magnetic heater for wiper blade system of the present invention.

FIG. 9 depicts another preferred embodiment of the wiper blade for use in the magnetic heater for wiper blade system of the present invention, showing the quick disconnect [42] that enables easy removal for servicing and replacement. FIG. 10 depicts a cross-sectional view of the windshield wiper blade and the quick disconnect taken from FIG. 9.

A valve [40] is included which activates the cleaning solution to create a hammering action, aiding in cleaning and regulating the amount of the liquid or vaporized cleaning solution which is channeled through the nozzles onto the vehicle windshield or headlights. A quick disconnect [42] enables the enhanced windshield wiper blade assembly of the present invention [10A] to be easily removed for servicing and replacement.

A generator [36] enables a vaporization of the fluid in instances where steam is needed, such as in harsh winter conditions in which there is heavy ice buildup, or the cleaning of dead insects on the windshield or headlight.

For the most efficient operation of the magnetic heater for wiper blade system of the present invention, it is recommended that the following ranges and parameters be used. The pressure of the liquid into the reservoir is between 1.5 and 2.5 bars and preferably about 2.0 bars, which is also the pressure of the operational system while in the working regime of hot cleaning solution. The temperature of the liquid cleaning solution initially varies between 35° C. and 55° C., and preferably in the range of 40° C. to 50° C., when the cleaning solution flows out of the nozzles because of the differences in diameters of feeding pipe and nozzles the pressure increases two to three times (to about 4-6 bars). This is the working pressure of the system on the cleaning surface.

Adding the valve [40] into the system provides two additional advantages:

Breaking up the flow of the liquid and delivering the "hammer effect" of pulses (3-5 pulses per/sec) increases the cleaning effect onto the surface to be cleaned; and Preserving the amount of cleaning solution because of the working regime of the valve [40] and regulated the time of opening and closing define the flow rate of the cleaning solution.

When the system is in working regime the vaporized cleaning solution will be in the temperature range of 100° C. and 118° C., and preferably between 105° C. and 110° C. The pressure on the cleaning surface will preferably be 1 Bar=1 kg/cm$^2$, adding the diameter of the nozzle with pressure of 4 Bar=4 kg/cm$^2$, or 0.04 kg/mm$^2$.

Also, the wiper blade [10A] is preferably a rubber or rubber-like material and is the same color as the body of the vehicle. That is, for example, a red-colored wiper blade is used to match a red vehicle. This will enhance the marketing of the windshield wiper of the present invention.

In addition, a heavy-duty motor and gear reduction system is recommended in extreme weather conditions, to ensure that the wiper blades have sufficient power to overcome any build-up of snow and sleet on the surface to be cleaned.

As is known from electrical engineering, the temperature at which a conductor is heated is the product of its resistance and the square of current flowing: $t=RI^2$. The formula shows that the higher the current, the temperature grows exponentially.

Figure 11:
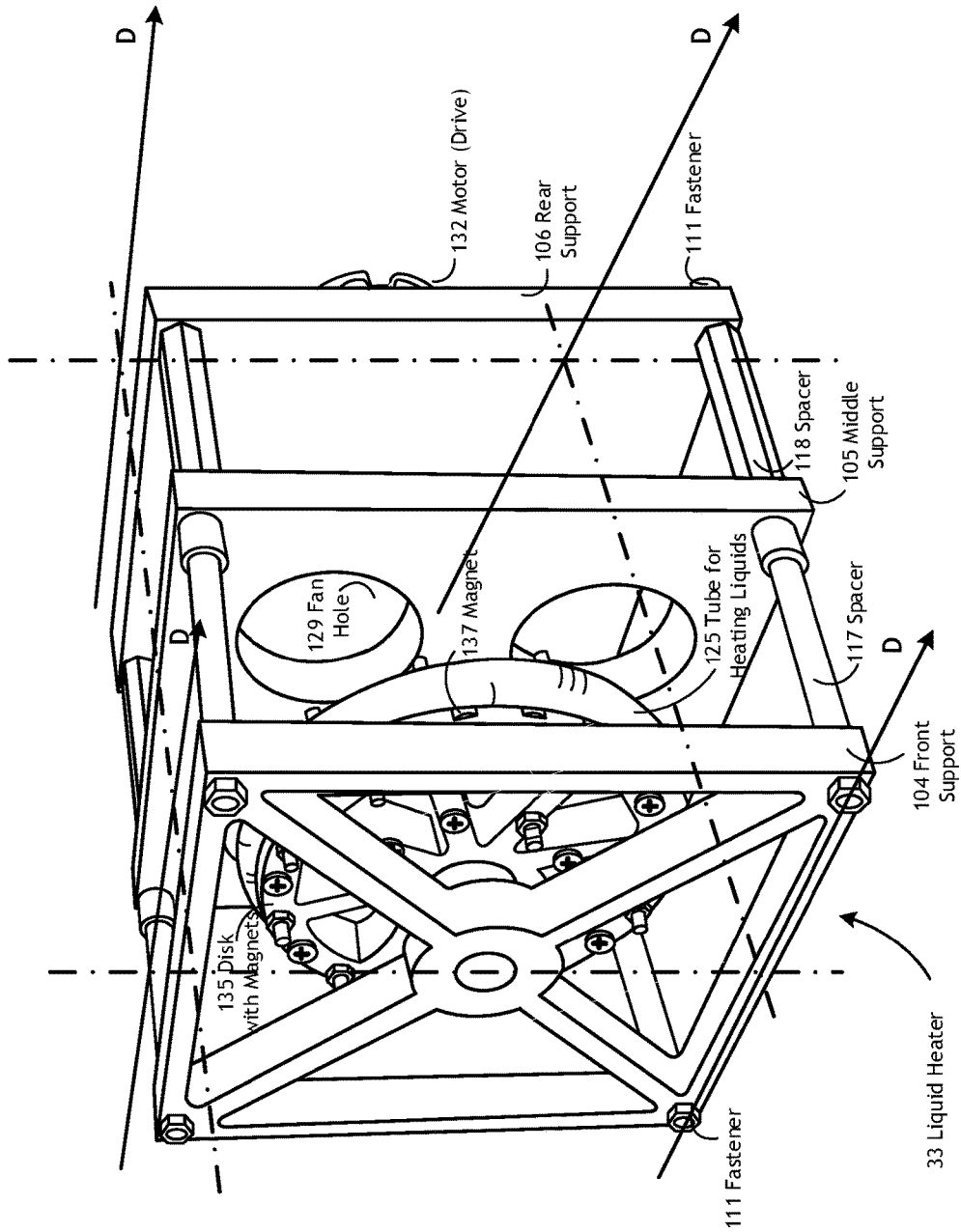
FIGS. 11, 12, and 13 depict a first preferred embodiment of a liquid heater of the magnetic heater for wiper blade system of the present invention, showing an assembly view, a sectional view taken from the assembly view and a front view.
Figure 12:
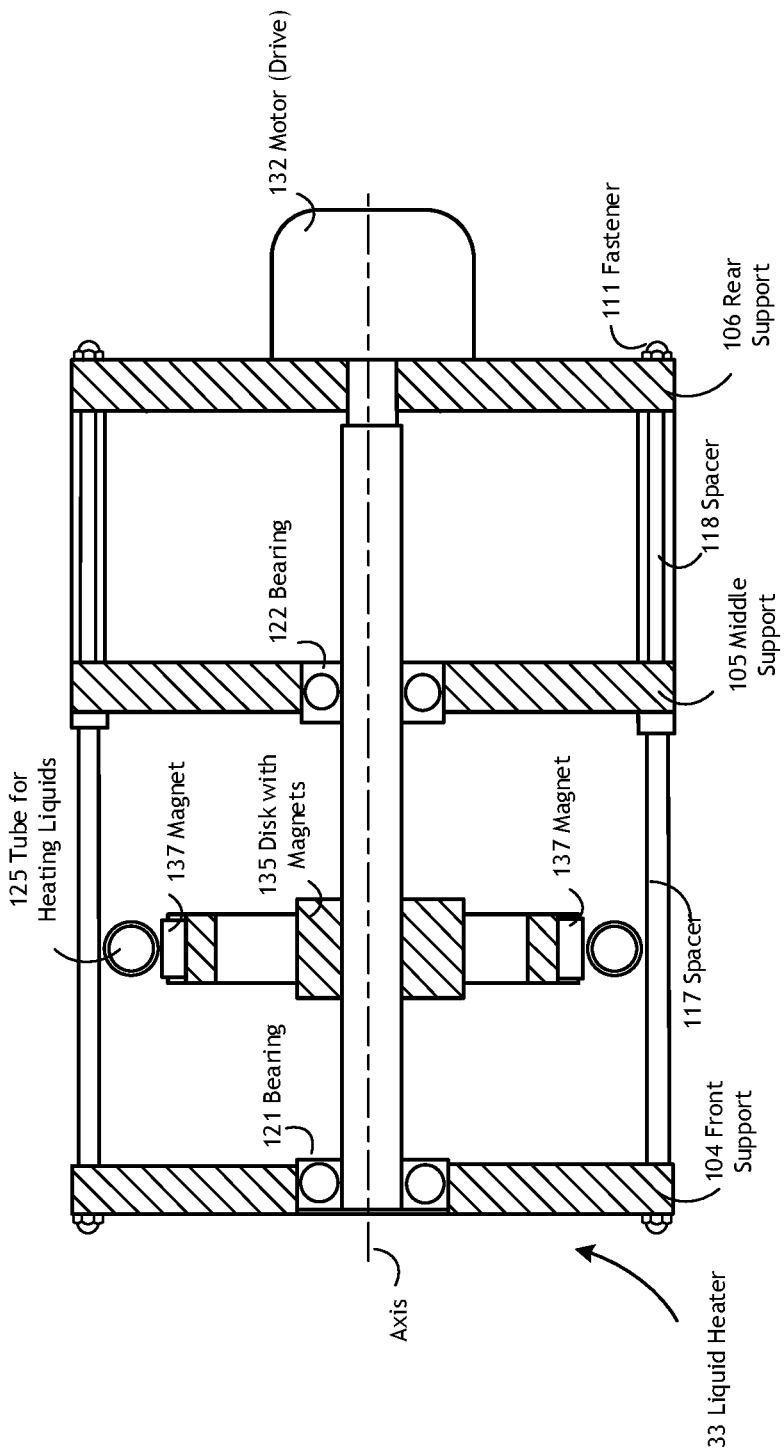
Figure 13:
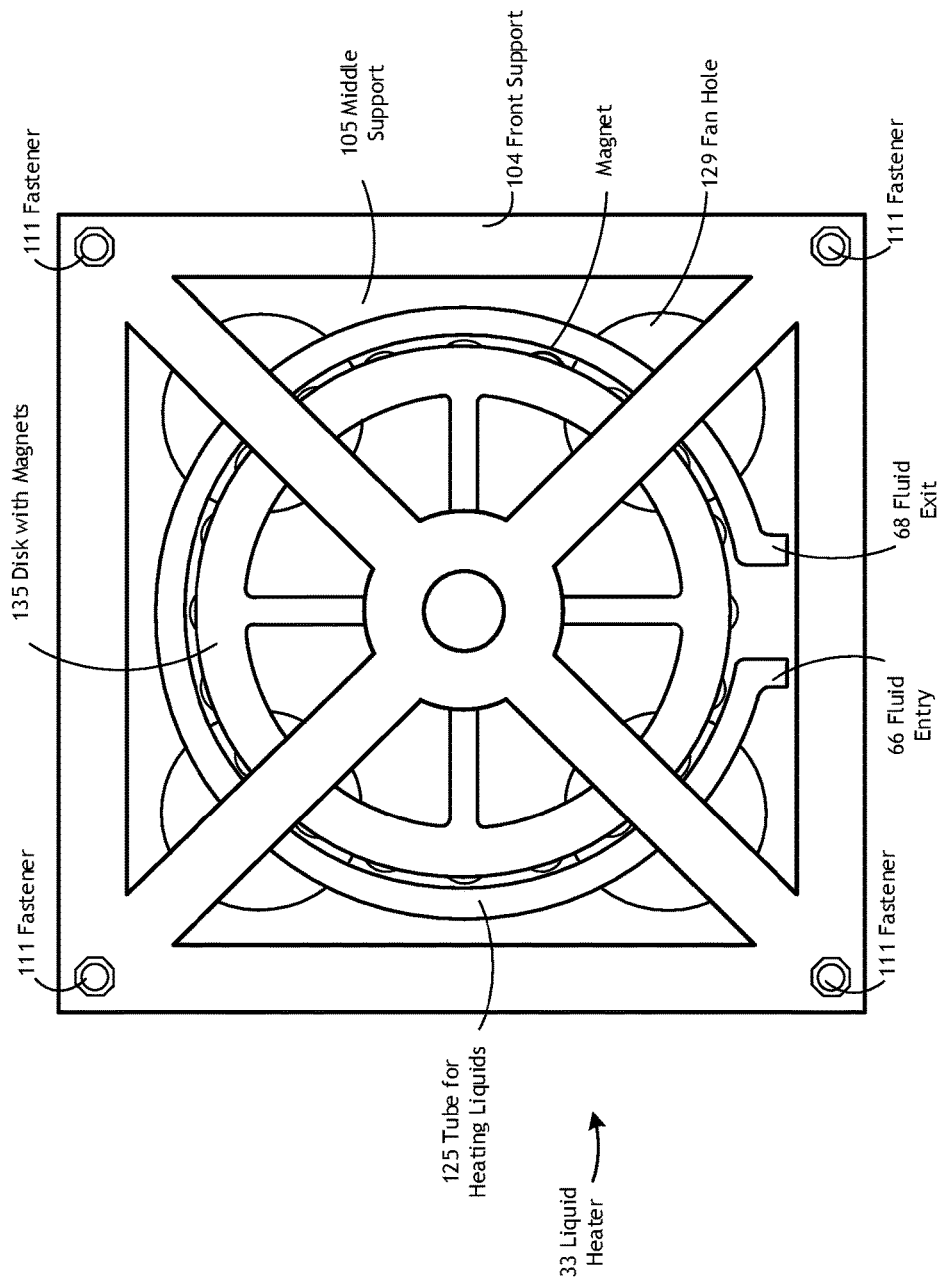

FIGS. 11, 12, and 13 depict a first preferred embodiment of a liquid heater [33] of the magnetic heater for wiper blade system of the present invention. FIG. 11 depicts an assembly view, FIG. 12 depicts a sectional view D-D taken from FIG. 11, and FIG. 13 depicts and a front view.

The construction comprises a front support plate [104], a middle support plate [105], and a rear support plate [106] with holes for fixing the various components and bearing beds. The front support plate [104] and middle support plate [105] are separated by four spacers [117] one being disposed one at each corner. In addition middle plate [105] and rear support plate [106] are separated by four spacers [118] one being disposed one at each corner.

A disk of non-magnetic material (which preferably is a plastic) in which strong magnets (preferably, neodymium, samarium or alnico) are firmly attached rotate at high speed near a short-wound conductor in which short-circuit current is induced, which is proportional to the force of the magnet and the speed of rotation and inversely proportional to the distance between the magnet and the conductor. When the electric current flows through the conductor, the metal of the conductor is heated. The temperature to which the conductor is heated depends upon magnet force, the number of disc magnets, the revolutions of the disc, the conductor material, and the distance between the magnets and the conductor.

The tube for heating liquids [125] preferably surrounds the disk with magnets [135]. The magnets [137] here are circular in shape and are disposed about the perimeter of the disk with magnets [135]. A plurality of fan holes [129], preferably four, equally spaced are disposed in the middle support. A fluid entry [66] is disposed on at one bottom of the device and a fluid exit [68] is disposed on the other bottom of the device (about 350 degrees away).

The magnetic heater for wiper blade system of the present invention preferably has a closed contour loop construction. The magnets are firmly attached and rotate at high speed near a short-wound conductor in which a short-circuit current is induced. The induced current is proportional to the force of the magnet and the rotational speed. The induced current is inversely proportional to the distance between the magnet and the conductor. The stronger magnets will increase the temperature of the wiper cleaning solution. The magnetic assembly includes either a plurality of circular-shaped magnets or a plurality of parallelepiped-shaped magnets. A higher magnet rotational speed increases wire temperature of the wiper cleaning solution.

An axle [72] is centrally mounted relative to the front support plate [104], the middle support plate [105], and the rear support plate [106], which are each parallel to each other, of equal size to each other, and centrally disposed relative to each other.

A ring-like outer tube surrounding the disk with magnets is preferably coaxially mounted with the disk with magnets and mounted between the front support [104] and the middle support [105] and mounted on a centrally positioned axle [72] by a pair of bearings [121 and 122]. The first bearing [121] is preferably mounted in front support [104], and the second bearing [122] is mounted in the middle support [104].

The actuator can be driven by any external drive [132] (electric motor, steam turbine, internal combustion engine, etc.). When driven by an electric motor, the electric motor [132] may be external to the magnet disk or integrated into the disk construction. The electric motor [132] is disposed outside rear support [106].

The main advantage of this construction is the low resistance moment (the effect of Jules-Lenz reaction of the rotor) at the rotation of the disk with the magnets to the conductor. This is due to the absence of an iron magnet-conductor and some features of the geometry of the magnetic field of the circular conductor. The strength of the magnetic field in the circle is greater than it is outside. This stems from the fact that the magnetic power lines are perpendicular to the direction of the current flow (the rule of the shrunken fingers of the right hand), which means that with a circular short wound conductor, the density of the magnetic power lines within the circle will be greater than those outside it. This is followed by the lower feedback. Depending on what we will heat: gas or liquid is selected and the type of conductor. When heating the air (gas) the conductor is produced in separate sections, which are blown with a fan. When a liquid is heated, the conductor is made in the form of a pipe.

The vertical support plates are joined together with appropriate spacers to form a suitable structure. The construction shown in the picture is designed to heat air and for this reason, large holes are cut into the front plate to allow free movement of the air. It also has a bearing seat (bed) for the front end of the axle. The middle plate serves to attach the second bearing to the axle as well as the blowers. On the third plate is mounted a drive motor system. It can be any type. The necessary condition is to have sufficient power to drive the disk and maintain the required speed depending on the selected output power, as well as the possibility of a wide range of speed control. A two-point axle attachment system has been chosen for greater stability at high revolutions. But another mechanical scheme may be applied. The axis is made of non-magnetic stainless steel or other suitable non-magnetic material (for example: duralumin, bronze, brass, technical plastics of the appropriate strength, etc.). The disk with the magnets is mounted on the axis between the first and second support plates. The design of the disk may be of a different type depending on the selected types of magnets and their geometrical shape.

In our case, we have made two constructions: circular magnets and rectangular (parallelepiped).

A hole is formed at the rear end of the axle along the axis of the motor shaft and, with the aid of hidden screws, is firmly attached to the axle. The bearings of the axle must be high-speed designed for continuous operation. The second plate is fitted with fans with suitable parameters and adjustable revolutions to provide a suitable flow rate and airflow rate for proper operation of the device. At the periphery of the disc, the heating elements, which constitute copper (or other suitable material), are mounted on the dimensions and composition of the construction and at a distance of 1 to 4 mm. The disk magnets are placed in sequence: N-S-N-S, and so on. The number of magnets and their force is arbitrary. Their parameters as well as the parameters of the whole structure are determined depending on the required output power. The power of the system can vary from a few dozen watts to tens and hundreds of kilowatts. When the disk rolls open, the magnets begin to pass along the wires forming the heating elements, and through them there is an electric current that will heat them to a predetermined temperature. The temperature of the generators can be controlled in two ways: by rotating the disc or by controlling the flow of air (flow rate and speed). When heating liquids around the disk, a copper (or other suitable material) pipe is inserted through which a liquid is passed which cools the tube and thus heats it up. The temperature is again controlled by either varying the speed of the disk or by varying the speed of movement of the fluid in the tube.

Figure 14:
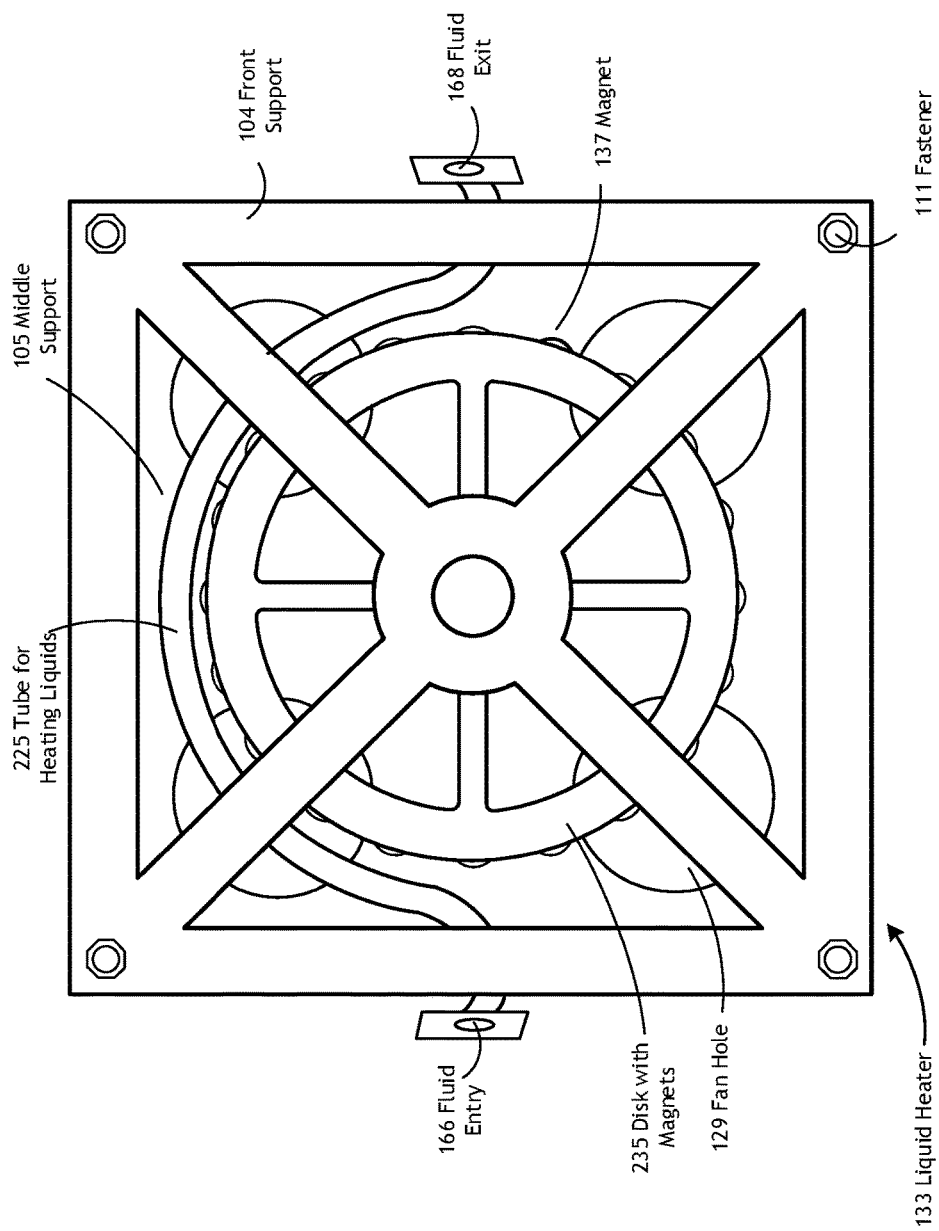
FIG. 14 depicts a second preferred embodiment (a variation of the first preferred embodiment) showing a front view another variation that may be deployed with the windshield wiper system of the present invention.

FIG. 14 depicts a second preferred embodiment (a variation of the first preferred embodiment) showing a front view another variation that may be deployed with the windshield wiper system of the present invention. The tube covers half the periphery of the disk with the magnets (180°) and valves are fitted at both ends. When the pipe temperature is reached (e.g. 300° C.), the inlet valve opens and injects into the water pipe. When the water contacts the hot walls of the pipe it evaporates and increases the pressure in the pipe, at this point, the outlet valve opens and releases the steam into a suitable tank or in the surrounding area.

The tube for heating liquids [225] preferably abuts around half of the disk with magnets [235]. The magnets [137] here are circular in shape and are disposed about the perimeter of the disk with magnets [135]. A plurality of fan holes [129], preferably four, equally spaced are disposed in the middle support. A fluid entry [166] is disposed on one side of the device and a fluid exit [168] is disposed on the other side of the device (about 180 degrees away).

Figure 15:
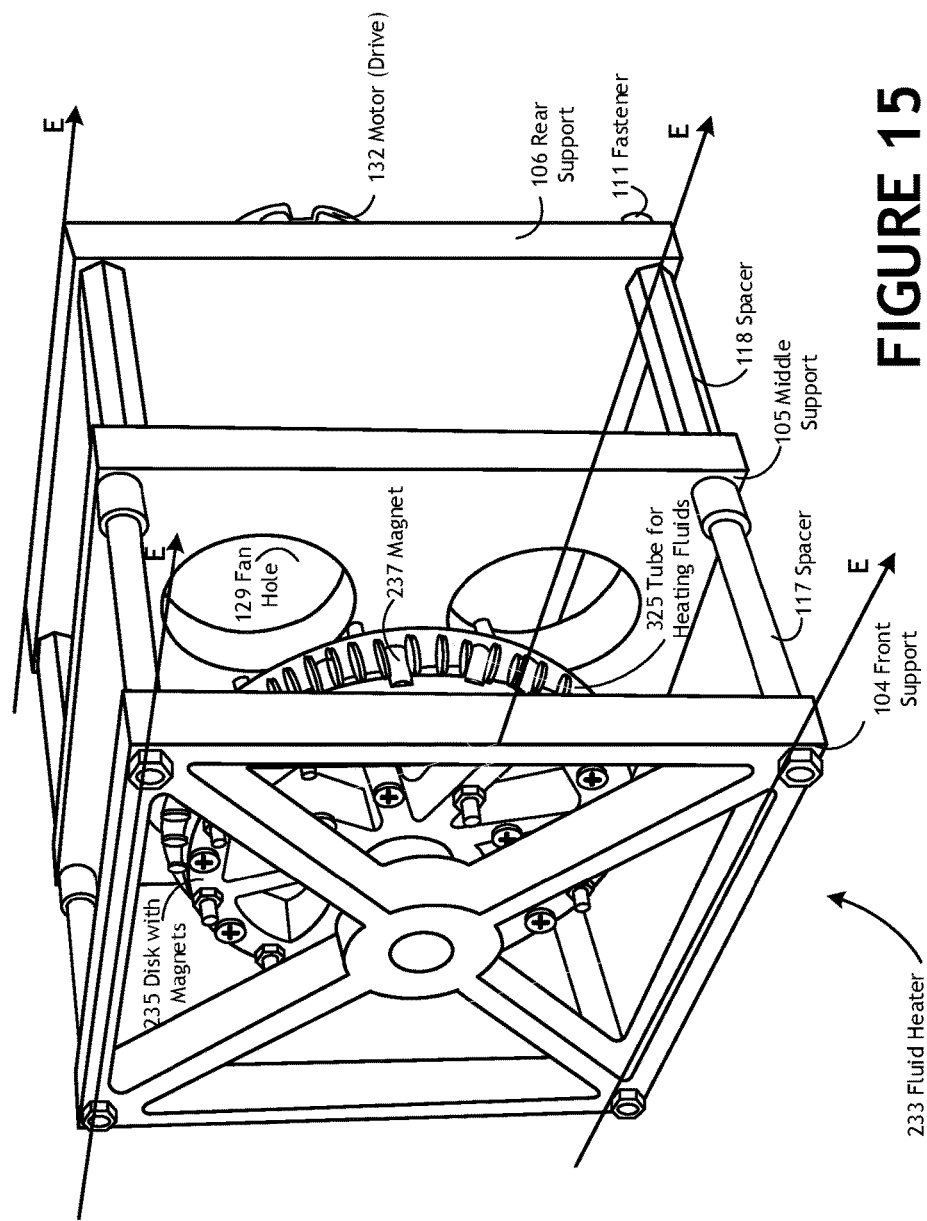
FIGS. 15, 16, and 17 depict another preferred embodiment of a fluid heater of the magnetic heater for wiper blade system of the present invention showing an assembly view, a sectional view taken from the assembly view and a front view.
Figure 16:
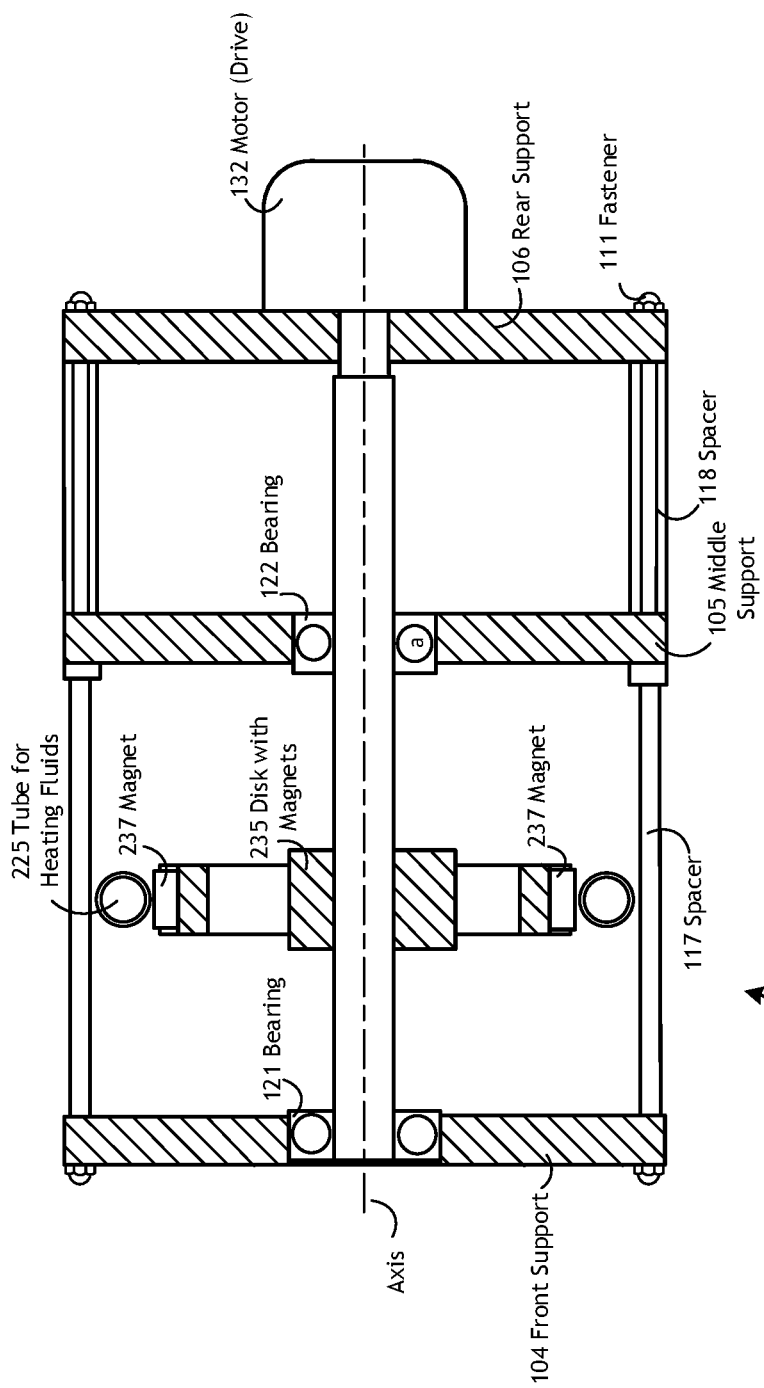
Figure 17:
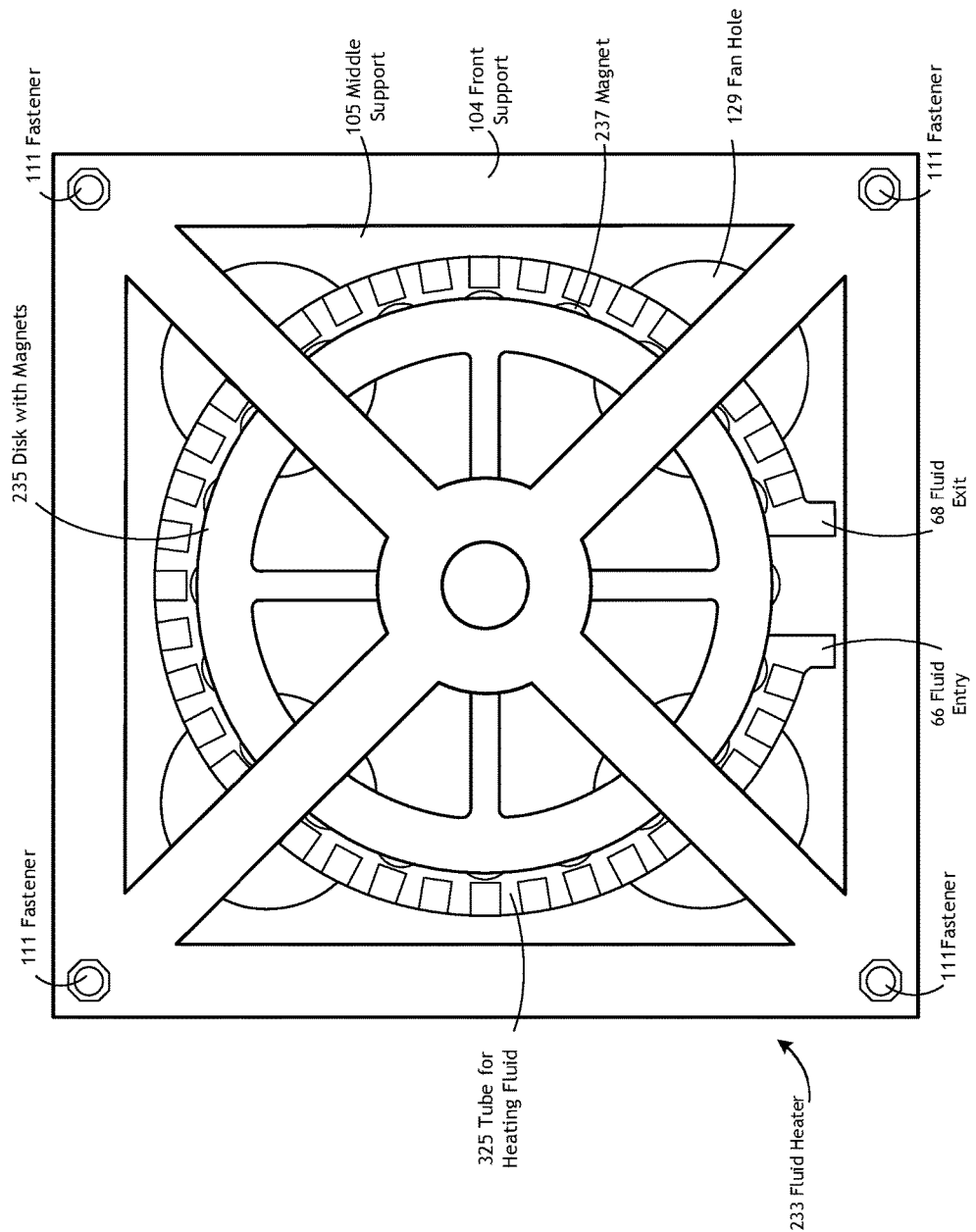

FIGS. 15, 16, and 17 depict another preferred embodiment of a fluid heater of the magnetic heater for wiper blade system of the present invention showing an assembly view, a sectional view taken from the assembly view and a front view. While this preferred embodiment works best for heating fluids at higher temperatures, it is believed that the configuration will work with the wiper cleaning solution of the present invention.

The tube for heating liquids [325] preferably surrounds the disk with magnets [235]. The magnets [237] here are circular in shape and are disposed about the perimeter of the disk with magnets [135]. A plurality of fan holes [129], preferably four, equally spaced are disposed in the middle support. A fluid entry [66] is disposed on at one bottom of the device and a fluid exit [68] is disposed on the other bottom of the device (about 350 degrees away).

Figure 18:
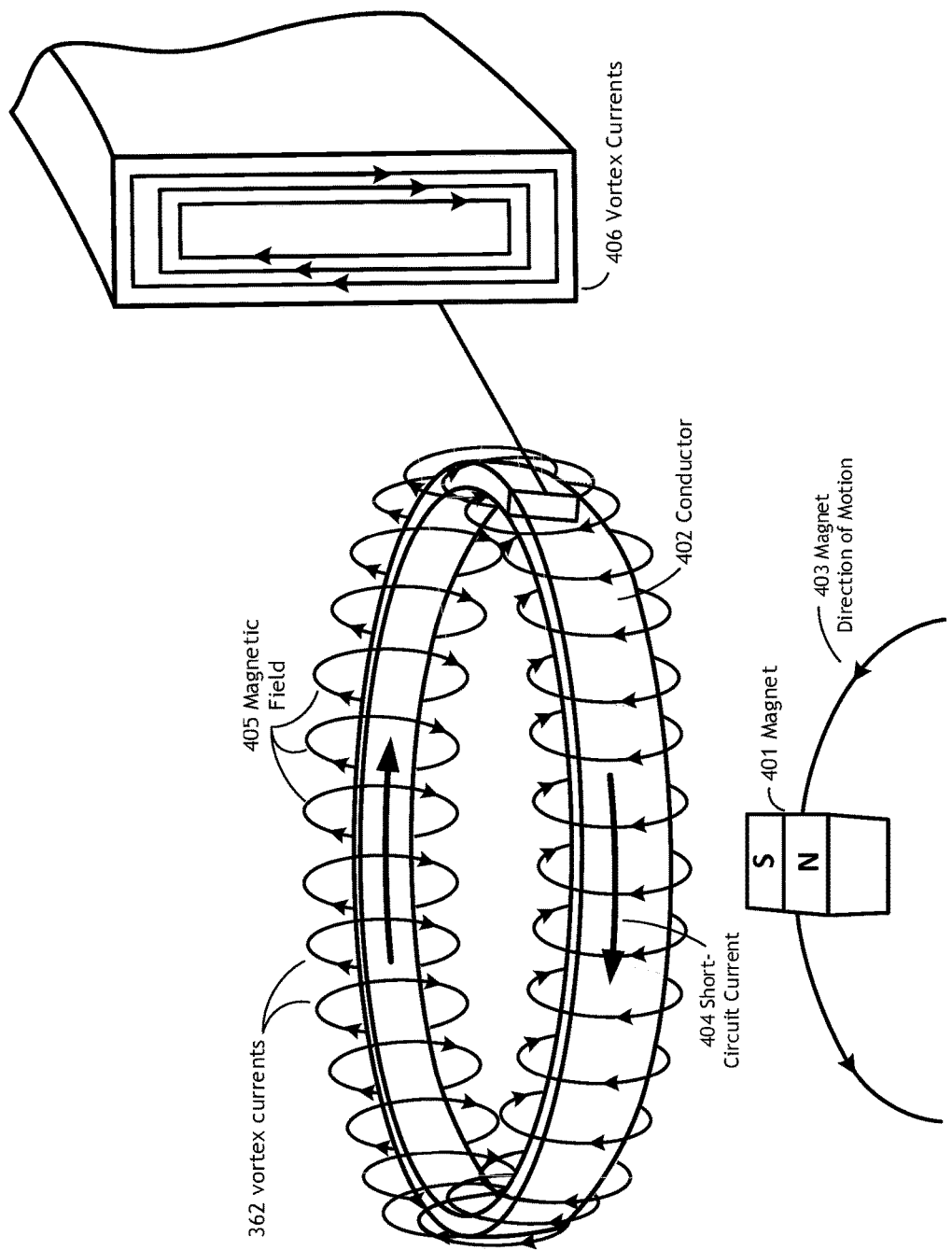
FIG. 18 summarizes the principles of operation of the steam generator used in the magnetic heater for wiper blade system of the present invention, the figure depicting a short-wired wire along which a permanent magnet passes.

FIG. 18 depicts the principals of the magnetic heater for wiper blade system of the present invention depicting a short-circuit current that runs longitudinally along the wire perpendicular to the vortex currents.

When the magnet passes along the conductor, a voltage is induced in the conductor, causing the current to flow through the conductor. The currents flowing through the conductor are two types: Foucault currents or vortex currents that run across the conductor (the exported figure), and a short-circuit current that runs longitudinally along the wire (the large arrow).

The generator [33] vaporizes the wiper cleaning solution by rotating the magnet assembly relative to the conductor assembly housing the wiper cleaning solution about an axis so as to induce eddy currents when relative motion is produced between the conductor assembly and the magnet assembly [135].

FIG. 18 summarizes the principles of operation of the steam generator used in the magnetic heater for wiper blade system of the present invention, the figure depicting a short-wired wire along which a permanent magnet passes.

When the magnet (401) passes along the conductor (402), where the direction of motion of the magnet (403), a voltage is induced in the conductor, causing the current to flow through the conductor. The currents flowing through the conductor are two types: Foucault currents or vortex currents (406), that run across the conductor (the exported figure), and a short-circuit current that (404) runs longitudinally along the wire (the large arrow).

The magnetic field (405) that is formed in the course of the two currents is quite complicated, but we can define it with a great deal of precision as shown in the figure (circular cross lines with the arrows). The magnetic field is always perpendicular to the direction of the current flowing. In the instance of a circular shape of the conductor, the density of the magnetic power lines is larger than the inside of the circle than the outside. The direction of the magnetic field generated in the conductor is opposite to the field of the magnet that causes it. This is called "rotor feedback" or "Lenz effect".

As a result of the generally circular shape of the conductor and the characteristics of the propagation of the magnetic power lines (405) (always perpendicular to the current flowing) on the outside of the ring, the strength of the field is smaller than the inner, which leads to the reduction of the effect of Lenz, and this in turn reduces the force that is needed to drive the magnet. The outlined section shows how the Foucault vortex flows (406).

Throughout this application, various Patents and Applications are referenced by number and inventor. The disclosures of these documents in their entireties are hereby incorporated by reference into this specification in order to more fully describe the state of the art to which this invention pertains.

It is evident that many alternatives, modifications, and variations of the magnetic heater for wiper blade system of the present invention will be apparent to those skilled in the art in light of the disclosure herein. It is intended that the metes and bounds of the present invention be determined by the appended claims rather than by the language of the above specification, and that all such alternatives, modifications, and variations which form a conjointly cooperative equivalent are intended to be included within the spirit and scope of these claims.

PARTS LIST 10A, 10B, 10C. Wiper Blades
11. Windshield Wiper
12. Cleaning Surface
14. Semicircular Tip
16. Cylindrical Channel
20. Nozzle
22. Integral Nozzle
28. Liquid Reservoir
29. Fluid Reservoir
30. Pump
32. Fluid Tube
33. Generator
34. Vapor Reservoir
35. Vapor Distributor
37. Controller
39. Space
40. Valve
41. Connection to On-Board Vehicle Computer
42. Quick Disconnect
44. Cylindrical Channel
48. Surface Being Cleaned
52. Inside Surfaces
66. Fluid Entry
68. Fluid Exit
72. Axle
104. Front Support
105. Middle Support
106. Rear Support
111. Fastener
117 and 118. Spacers
121 and 122. Bearings
125. Tube for Heating Liquids
129. Fan Hole
132. Motor
133. Liquid Heater
135. Disk with Magnets
137. Magnet
166. Fluid Entry
168. Fluid Exit
225. Tube for Heating Liquids
233. Fluid Heater
235. Disk with Magnets
237. Magnet
325. Tube for Heating Fluids
361. Short Circuit Current
362. Vortex Currents
401. Magnet
402. Conductor
403. Direction of Motion of the Magnet
404. Short-Circuit Current
405. Magnetic Field
406. Vortex Currents

We claim:

1. A wiper system for cleaning debris and stains from a surface being cleaned, said surface being cleaned being a windshield or headlight of a vehicle, said wiper system comprising:
   a liquid reservoir for storing wiper cleaning solution;
   a controller in fluid communication with said liquid reservoir;
   a pump that when engaged applies pressure to said wiper cleaning solution in said liquid reservoir, said pump moving said wiper cleaning solution from said liquid reservoir into a generator, said wiper cleaning solution vaporizing in said generator for subsequent distribution to a wiper, said wiper including a hollow cavity extending into said wiper, said wiper including a pair of cleaning edges for contacting said windshield or headlight of said vehicle being cleaned, said hollow cavity being in fluid communication with a plurality of nozzles, a tip being disposed between said pair of cleaning edges, said plurality of nozzles being disposed in said tip and along a length of said wiper, said pair of cleaning edges and said tip forming a space, said space having a cross section with a convex shape;
   a fluid passageway being in fluid communication with said liquid reservoir, said pump, said generator and said wiper, said generator vaporizing said wiper cleaning solution by rotating a magnet assembly relative to a conductor assembly housing said wiper cleaning solution about an axis so as to induce eddy currents when relative motion is produced between said conductor assembly and said magnet assembly; and
   whereby upon engagement of said controller, said wiper cleaning solution is delivered and pulsed into said space and across said surface to be cleaned of said vehicle to remove any debris or stains therefrom.

2. The wiper system of claim 1, wherein said magnet assembly has a closed contour loop construction.

3. The wiper system of claim 1, wherein said magnets are firmly attached and rotate at high speed near a short-wound conductor in which a short-circuit current is induced.

4. The wiper system of claim 3, wherein said induced current is proportional to the force of the magnet and the rotational speed.

5. The wiper system of claim 3, wherein said induced current is inversely proportional to the distance between said magnet and said conductor.

6. The wiper system of claim 3, wherein stronger magnets increase temperature of said wiper cleaning solution.

7. The wiper system of claim 3, wherein said magnetic assembly includes either a plurality of circular-shaped magnets or a plurality of parallelepiped-shaped magnets.

8. The wiper system of claim 3, wherein higher magnet rotational speed increases wire temperature of said wiper cleaning solution.

9. The wiper system of claim 3, wherein said wiper cleaning solution is between 35° C. and 55° C.

10. The wiper system of claim 3, wherein said vaporized cleaning solution is between 100° C. and 118° C.

11. A wiper system for cleaning debris and stains from a surface being cleaned, said surface being cleaned being a windshield or headlight of a vehicle, said wiper system comprising:
- a liquid reservoir for storing wiper cleaning solution;
- a controller in fluid communication with said liquid reservoir;
- a pump that when engaged applies pressure to said wiper cleaning solution in said liquid reservoir, said pump moving said wiper cleaning solution from said liquid reservoir into a generator, said wiper cleaning solution vaporizing in said generator for subsequent distribution to a wiper, said wiper including a hollow cavity extending into said wiper, said wiper including a pair of cleaning edges for contacting said windshield or headlight of said vehicle being cleaned, said hollow cavity being in fluid communication with a plurality of nozzles, said nozzles being normally closed and said nozzles open as pressurized wiper cleaning solution is circulated therethrough, a tip being disposed between said pair of cleaning edges, said plurality of nozzles being disposed in said tip and along a length of said wiper, said pair of cleaning edges and said tip forming a space, said space having a cross section of a convex shape;
- a fluid passageway being in fluid communication with said liquid reservoir, said pump, said generator and said wiper, said generator vaporizing said wiper cleaning solution by rotating a magnet assembly relative to a conductor assembly housing said wiper cleaning solution about an axis so as to induce eddy currents when relative motion is produced between said conductor assembly and said magnet assembly; and
- whereby upon engagement of said controller, said wiper cleaning solution is delivered and pulsed into said space and across said surface to be cleaned of said vehicle to remove any debris or stains therefrom.

12. The wiper system of claim 11, wherein said magnet assembly has a closed contour loop construction.

13. The wiper system of claim 12, wherein said magnets are firmly attached and rotate at high speed near a short-wound conductor in which a short-circuit current is induced.

14. The wiper system of claim 13, wherein said induced current is proportional to the force of the magnet and the rotational speed.

15. The wiper system of claim 13, wherein said induced current is inversely proportional to the distance between said magnet and said conductor.

16. The wiper system of claim 13, wherein stronger magnets increase temperature of said wiper cleaning solution.

17. The wiper system of claim 13, wherein said magnetic assembly includes either a plurality of circular-shaped magnets or a plurality of parallelepiped-shaped magnets.

18. The wiper system of claim 13, wherein higher magnet rotational speed increases wire temperature of said wiper cleaning solution.

19. The wiper system of claim 13, wherein said wiper cleaning solution is between 35° C. and 55° C.

20. The wiper system of claim 13, wherein said vaporized cleaning solution is between 100° C. and 118° C.

* * * * *